(12) United States Patent
Kujala et al.

(10) Patent No.: US 9,081,398 B2
(45) Date of Patent: Jul. 14, 2015

(54) ADAPTIVE STARTUP CONTROL FOR BOOST CONVERTER

(71) Applicant: Fairchild Semiconductor Corporation, San Jose, CA (US)

(72) Inventors: Juha-Matti Kujala, Kokkola (FI); Juha Joonas Oikarinen, Santa Clara, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 231 days.

(21) Appl. No.: 13/826,818

(22) Filed: Mar. 14, 2013

(65) Prior Publication Data

US 2013/0249513 A1    Sep. 26, 2013

Related U.S. Application Data (60) Provisional application No. 61/614,731, filed on Mar. 23, 2012.

(51) Int. Cl.
*H02M 1/36* (2007.01)
*G05F 1/10* (2006.01)
(52) U.S. Cl.
CPC .......................................... *G05F 1/10* (2013.01)
(58) Field of Classification Search
CPC .. H02M 3/156; H02M 3/158; H02M 3/33507
USPC ......... 323/222, 288, 282–285, 315–317, 901; 363/49
See application file for complete search history.

(56) References Cited

U.S. PATENT DOCUMENTS

| 6,897,733 | B2 | 5/2005 | Wakayama | |
|---|---|---|---|---|
| 7,960,962 | B2* | 6/2011 | Li | 323/315 |
| 8,242,760 | B2* | 8/2012 | Takagi et al. | 323/276 |
| 8,564,272 | B2* | 10/2013 | Yen et al. | 323/288 |
| 2008/0224675 | A1* | 9/2008 | Takagi | 323/275 |
| 2013/0127536 | A1* | 5/2013 | Cavallaro et al. | 330/260 |

FOREIGN PATENT DOCUMENTS

| CN | 101295189 A | 10/2008 |
|---|---|---|
| CN | 101714868 A | 5/2010 |
| CN | 101753117 A | 6/2010 |

(Continued)

OTHER PUBLICATIONS

"Korean Application Serial No. 10-2013-0031461, Office Action mailed Aug. 7, 2013", (4 pgs).

(Continued)

*Primary Examiner* — Gary L Laxton
*Assistant Examiner* — Kyle J Moody
(74) *Attorney, Agent, or Firm* — Schwegman Lundberg & Woessner, P.A.

(57) ABSTRACT

This document discusses apparatus and methods for a boost converter start-up circuit. In an example, a start-up circuit can include a linear current generator configured to couple a supply terminal of the voltage converter to an output terminal of the voltage converter. The linear current generator can include a modified current mirror and a feedback circuit configured to provide a first representative of an output voltage of the output terminal to an input of each of a first and a second adjustable current source of the modified current mirror.

18 Claims, 6 Drawing Sheets

(56) References Cited

FOREIGN PATENT DOCUMENTS

| CN | 103326553 A | 9/2013 |
|---|---|---|
| CN | 203206104 U | 9/2013 |
| JP | 4251826 B2 | 4/2009 |
| KR | 1020130108204 A | 10/2013 |

OTHER PUBLICATIONS

"Chinese Application Serial No. 201310098159.7, Office Action mailed Dec. 3, 2014", 13 pgs

* cited by examiner

ADAPTIVE STARTUP CONTROL FOR BOOST CONVERTER

CLAIM OF PRIORITY

This application claims the benefit of priority under 35 U.S.C. 119(e) to Kujala et al., U.S. Provisional Patent Application Ser. No. 61/614,731, entitled, "ADAPTIVE STARTUP CONTROL FOR BOOST CONVERTER," filed Mar. 23, 2012, hereby incorporated by reference herein in its entirety.

OVERVIEW

This document discusses, among other things, apparatus and methods for a boost converter start-up circuit. In an example, a start-up circuit can include a linear current generator configured to couple a supply terminal of the voltage converter to an output terminal of the voltage converter. The linear current generator can include a modified current mirror and a feedback circuit configured to provide a first representative of an output voltage of the output terminal to an input of each of a first and a second adjustable current source of the modified current mirror.

This overview is intended to provide a general overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A "boost" converter, boost regulator, or step-up converter, is configured such that a predetermined voltage at the output of the converter can be greater than a voltage at an input of the converter. In certain examples, a boost converter can provide a minimum voltage rail for applications that require higher voltages than a battery, for example, can supply.

Upon start-up of a boost converter, conditions can exist that can prevent a boost controller from entering a boost mode unless current flow between the input of the boost converter and the output of the boost converter is controlled. At the same time, it can be desirable to have the boost converter begin regulating to output voltage of the boost controller as quickly as possible.

In some situations, startup of a boost converter can result in a large input current spike. Large input current spikes can cause the boost converter to shut down. In some boost converter applications, output capacitive loading is often unknown and the range of capacitance can be wide. a start-up duration of a boost converter can be slow where a high output capacitive loading exist and current limiting is implemented to reduce the possibility of high input current spikes. In certain situations, input current limiting can also result in extended start up intervals for boost conveters coupled to small capacitive loading applications.

The present inventors have recognized, among other things, various techniques that can reduce or eliminate large input current spikes during start-up of a boost converter and can adapt to load conditions such as different output capacitances. In certain examples, improved start-up behavior can be implemented to minimize input current spikes and overshoots, including applications with low-voltage battery. In certain examples, a boost controller can include an adaptive control to provide a short start-up interval for a wide range of capacitive loads. In some examples, the boost conveter reduce current transients as the boost conveter transistions between start-up and a boost mode of operation by pulling the output voltage of the boost controller substantially equal to, or very close to, the input voltage before transistioning to the boost mode, even during heavy load conditions.

Figure 1:
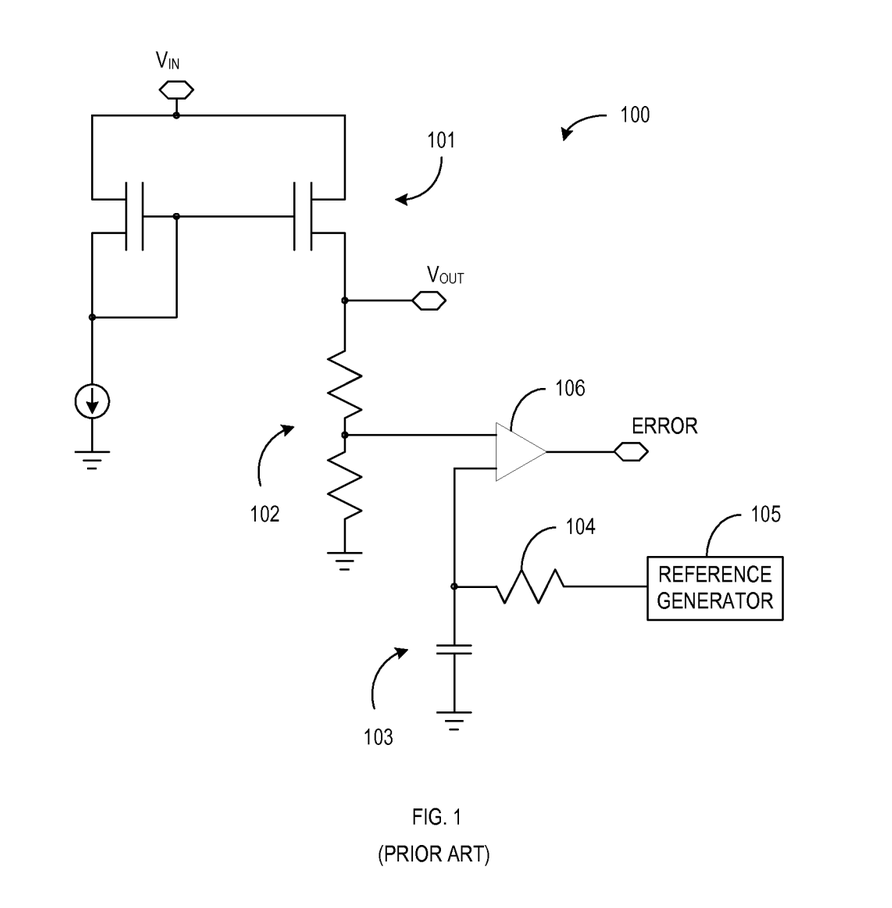
FIG. 1 illustrates an existing start-up circuit for a boost converter.

FIG. 1 depicts an existing start-up circuit 100 for a boost converter. The start-up circuit 100 includes a simple current mirror 101, a voltage divider 102, a reference capacitor 103, start-up resistor 104, a reference generator 105, and a comparator 106. The current mirror 101 can limit the start-up current flowing between the input voltage ($V_{IN}$) source and the load via the output voltage ($V_{OUT}$) of the boost converter. The interval of the start-up circuit 100 can be set by the combination of the reference generator 105, reference capacitor 103 and start-up resistor 104. As the reference capacitor 103 charges up to a value near the scaled output voltage provided by the voltage divider 102, the output (ERROR) of the comparator 106 can start the boost mode. Note that the start-up interval is independent of the difference between the input voltage ($V_{IN}$) and the output voltage ($V_{OUT}$) of the boost converter.

Figure 2:
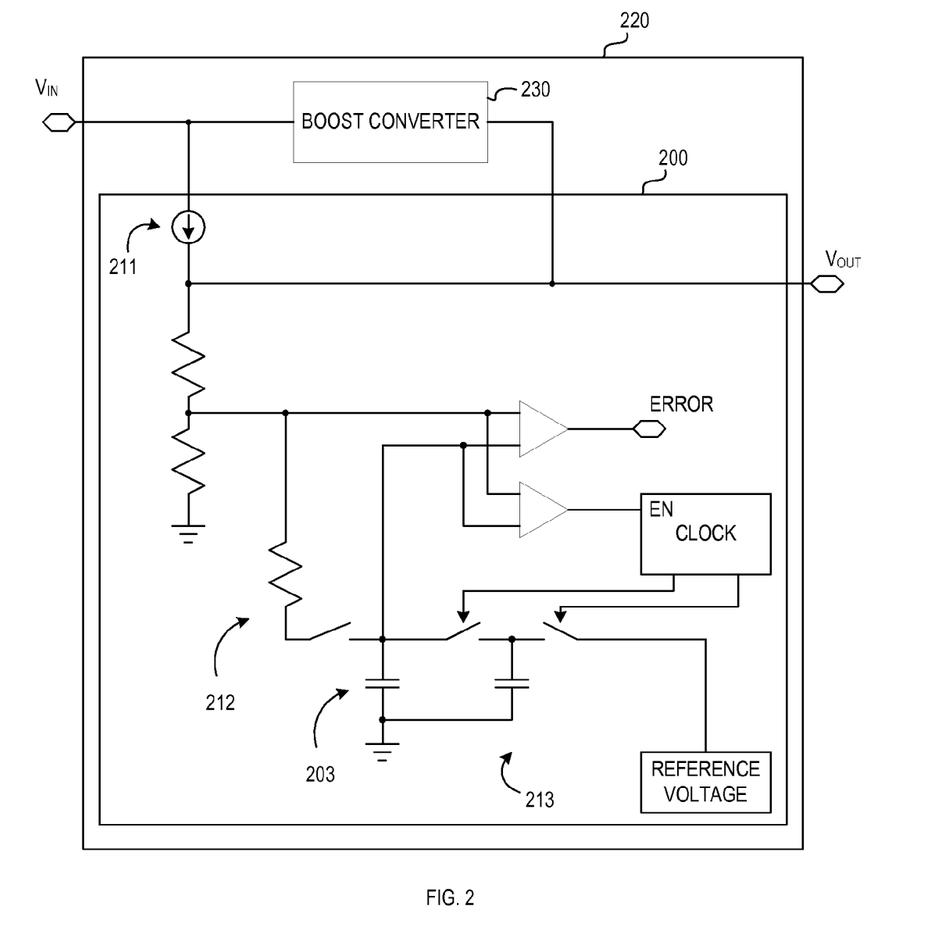
FIG. 2 illustrates generally an example start-up circuit for a boost converter.

FIG. 2 illustrates generally an example start-up circuit 200 for a voltage converter 200 including a boost converter 230. The start-up circuit 200 can include a linear current generator 211 including a modified current mirror, reference sampling circuit 212, and a reference stepping circuit 213 for controlling the rate of increase of the output voltage ($V_{OUT}$) of the boost controller after the start-up interval. In certain examples, the modified current mirror of the linear current generator can provide linear start-up current and can combine drain-source voltage ($V_{DS}$) and output voltage ($V_{OUT}$) feedback. In certain examples, combining drain-source voltage ($V_{DS}$) and output voltage ($V_{OUT}$) feedback can enable time-efficient start-up while reducing input current spikes even at high load conditions.

In certain examples, the reference sampling circuit 212 can enable a smooth start-up regardless of the output voltage $V_{OUT}$ before the startup event occurs by providing an indication of the initial output voltage to charge the reference capacitor 203.

In certain examples, the reference step circuit 213 can prevent high input rush current in the case of high capacitive loading of the output, and can assist in providing a fast startup with a low capacitive loading of the output, in contrast to existing techniques. In some examples, logarithmic reference stepping, at boost start-up, can improve the output voltage ($V_{OUT}$) slope over existing techniques and can reduce or eliminate input current ramp-up when the output voltage ($V_{OUT}$) approaches a target value.

Figure 3:
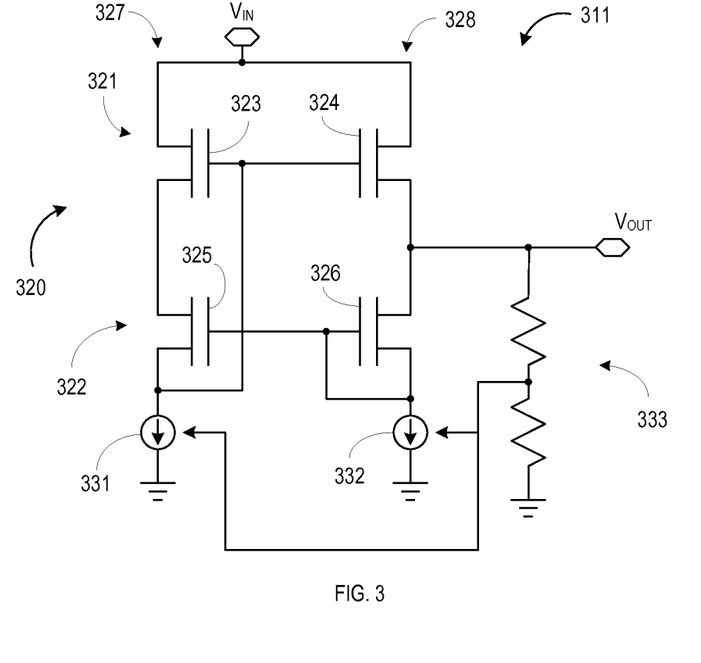
FIG. 3 illustrates generally an example linear current generator.

FIG. 3 illustrates generally an example linear current generator 311 including a modified current mirror 320 for limiting current from the input supply to the load of the boost converter upon first starting up the boost converter. In certain examples, the modified current mirror 320 can include a first current mirror 321 and a second current mirror 322 configured to selectively couple the input voltage ($V_{IN}$) of the input supply of the converter to the output of the converter. The first current mirror 321 can include a first sense transistor 323 and a first mirror transistor 324. The second current mirror 322 can include a second sense transistor 325 and a second mirror transistor 326. The modified current mirror 320 can have the control, or gate, nodes of the first current mirror transistors 323, 324 coupled to a drain of the second mirror transistor 325. In certain examples, the modified current mirror 320 can include a first leg 327 including the first sense transistor 323 and the second mirror transistor 325, and a second leg 328 including the first mirror transistor 324 and the second sense transistor 326.

In certain examples, the modified current mirror 320 can include first and second adjustable current sources 331, 332 and an output voltage feedback circuit 333 for adjusting the adjustable current sources 331, 332. In certain examples, the output voltage feedback circuit 333 can include a voltage divider coupled to the output voltage ($V_{OUT}$) of the boost converter. In certain examples, a scaled representation of the output voltage, provided by the output voltage feedback circuit 333, can provide at least a portion of a setpont to adjust the first and second adjustable current sources 331, 332. In certain examples, the first adjustable current source 331 can be coupled to the first leg 327 of the modified current mirror 320 and the second adjustable current source 332 can be coupled to the second leg 328 of the modified current mirror 320. The example configuration of the modified current mirror 320 can include both output voltage feedback and drain-to-source voltage (Vds) feedback. When the output voltage ($V_{OUT}$) is initially around zero volts at start-up, the output voltage feedback can reduce or eliminate current overshoot as the modified current mirror 320 begins to raise the output voltage ($V_{OUT}$). When the output voltage ($V_{OUT}$) nears the input voltage, the Vds feedback can maintain current flow to allow the output voltage ($V_{OUT}$) to continue to rise towards the input voltage ($V_{IN}$). In the case of a standard current mirror, as the output voltage approaches the input voltage level, the current drops and the rise of the output voltage stalls significantly short of the input voltage resulting in large current transients as the converter transitions from starting up to the boost mode.

Figure 4:
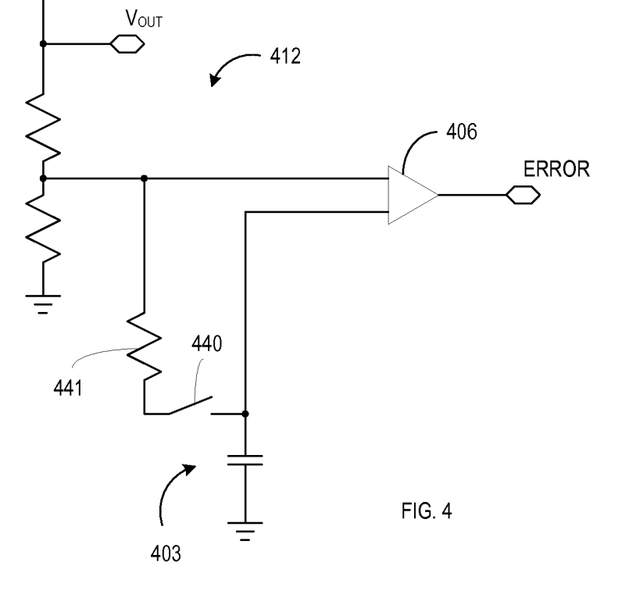
FIG. 4 illustrates generally an example output voltage sampling circuit.

FIG. 4, illustrates generally an example output voltage sampling circuit 412. In certain examples, the output voltage sampling circuit 412 can include a switch 440 and a charging resistor 441 coupled between a representation of the output voltage ($V_{OUT}$) for an amplifier 406 and a reference capacitor 403. In certain examples, the output voltage sampling circuit 412 can charge a reference capacitor 403 to a voltage representative of the output voltage ($V_{OUT}$). In certain examples, the voltage across the reference capacitor 403 can provide a target voltage, or boost set point, for the boost converter. By sampling the output voltage ($V_{OUT}$) during the startup of the boost converter, the boost mode can begin to boost the output voltage ($V_{OUT}$) from a known value and can reduce transients. This can provide better performance in cases where the boost controller is disabled for short period of time and the output voltage ($V_{OUT}$) does not fully discharge before the boost converter is re-enabled.

Figure 5:
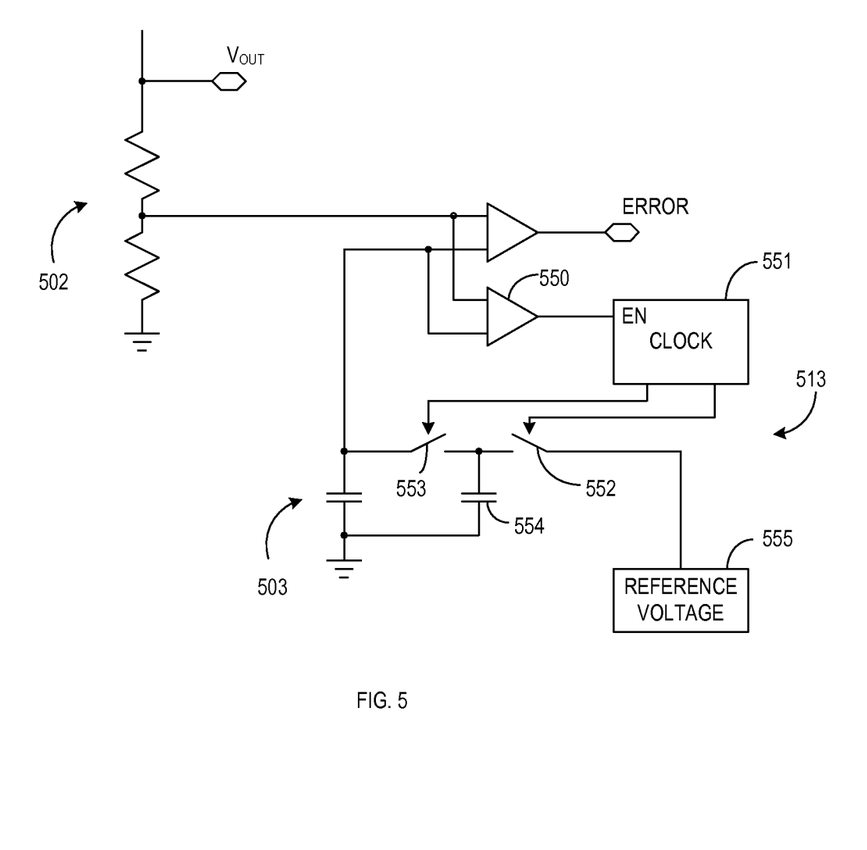
FIG. 5 illustrates generally an example reference step circuit 513.

FIG. 5 illustrates generally an example reference step circuit 513. In certain examples, the reference step circuit 513 can include a comparator 550 configured to compare a representation of the output voltage ($V_{OUT}$) to a target voltage and enable and disable a clock generator 551 responsive to the comparison. In an example, the output of the comparator 550 can provide an indication of the relative difference between the output voltage ($V_{OUT}$) and a target voltage. In certain examples, as the error between the actual output voltage ($V_{OUT}$) and the target voltage becomes smaller, the comparator 550 can enable the clock generator 551. In certain examples, the clock generator 551 can include at least two outputs. When enabled, the clock generator 551 can provide, or generate, a clock signal at the outputs, In some examples, the clock generator can generate a single pulse on one or more outputs. The pulse output of the clock generator 551 can change the state of a first switch 552 and a second switch 553 coupled to a step capacitor 554. In certain examples, the first switch 552 can be coupled between a reference voltage generator 555 and the step capacitor 554 and the second switch 553 can be coupled between the step capacitor 554 and a reference capacitor 503. In certain examples, the first and second switches 552, 553 alternately open and close such that in a first configuration or phase the step capacitor 554 is charged from the reference voltage generator 555 and in a second configuration or phase the step capacitor 554 charges the reference capacitor 503 to ramp the target voltage across the reference capacitor 503 up to a desired voltage level. In certain examples, the voltage across the reference capacitor 503 can provide a target voltage, or boost set point, for the boost converter and can be incrementally increased from a value representative of the input voltage ($V_{IN}$) to a value representative of the desired output voltage ($V_{OUT}$) after a start-up interval of the boost converter. In certain examples, the target voltage can ramp up logarithmically. Upon providing a step increase to the target voltage, the comparator 550 can disable the clock generator until the boost action of the converter boosts the output voltage, and the representation of the output voltage from a voltage divider 502 approaches the target voltage.

Figure 6A:
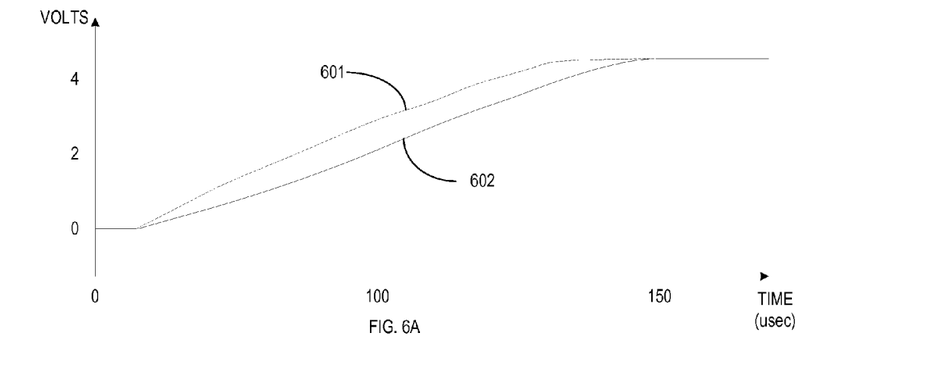
FIGS. 6A and 6B illustrate current and voltage waveforms of an example linear current generator and a standard current mirror during start-up of a boost converter.
Figure 6B:
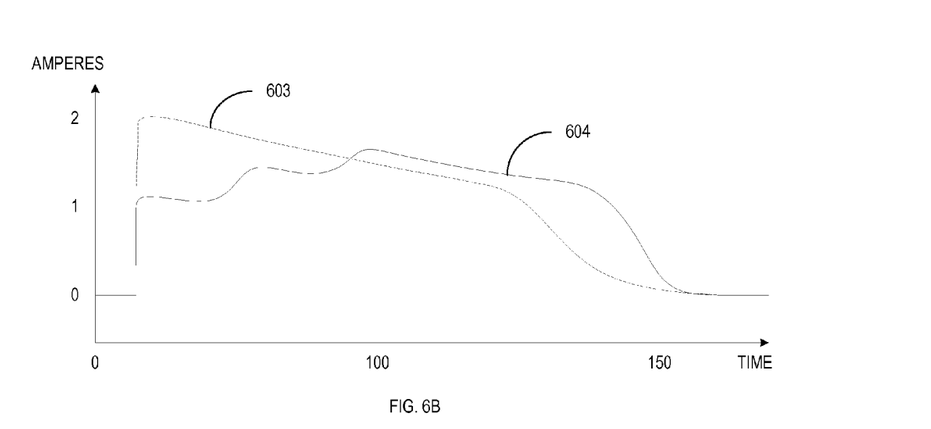

FIGS. 6A and 6B illustrate a comparison of current and voltage waveforms of an example linear current generator and a standard current mirror during start-up of a boost converter. FIG. 6A illustrates the voltage waveforms 601, 602 at the output of a boost controller using a standard current mirror 601 and an example linear current generator 602. FIG. 6B illustrates current waveforms 603, 604 and includes a first current waveform 603 associated with a standard current mirror and a second current waveform 604 associated with an example linear current generator as described above. In certain examples, the example linear current generator can reduce peak current at the beginning of the start up of a boost converter and can provide more current to raise the output voltage as the output voltage approaches the input voltage, compared to the standard current mirror.

Figure 7:
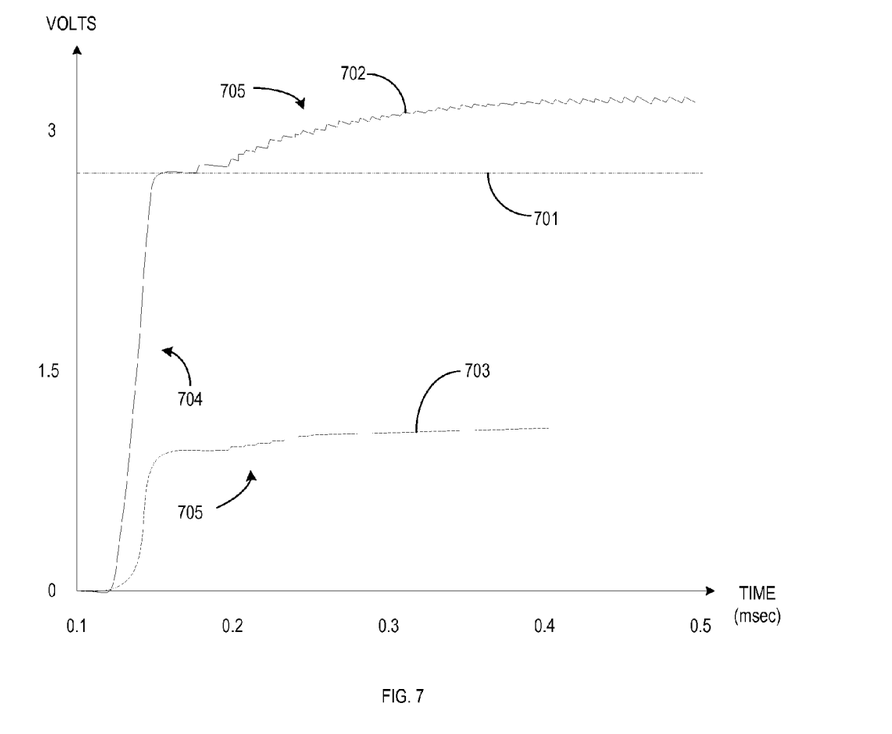
FIG. 7 illustrates waveforms associated with an example start-up circuit of a boost converter.

FIG. 7 illustrates waveforms associated with an example start-up circuit of a boost converter. A first waveform 701 illustrates the input voltage to the example start-up circuit of the boost converter. A second waveform 702 illustrates the output voltage of the example start-up circuit of the boost converter. A third waveform 703 illustrates a target voltage of the example start-up circuit of the boost converter. The combined waveforms illustrate the linear current start-up 704 and the stepped 705 target voltage and output voltage of the boost mode associated with an example start-up circuit as described above.

Additional Notes

In Example 1, a start-up circuit for a voltage converter can include a linear current generator configured to couple a supply terminal of the voltage converter to an output terminal of the voltage converter. In certain examples, the linear current generator can include a modified current mirror and a feedback circuit. In certain examples, the modified current mirror can include a first adjustable current source, and a second adjustable current source. In certain examples, the feedback circuit can be configured to provide a first representation of an output voltage of the output terminal to an input of each of the first and second adjustable current sources.

In Example 2, the modified current mirror of Example 1 optionally includes a first sense transistor coupled to the supply terminal, a first mirror transistor having a gate coupled to a gate of the first sense transistor, the first mirror transistor coupled to the supply terminal and the output terminal, a second sense transistor coupled in series with the first mirror transistor and the second adjustable current source, and coupled to the output terminal, and a second mirror transistor having a gate coupled to a gate of the second sense transistor, the second mirror transistor coupled in series with the first sense transistor, wherein the gate of the first sense transistor is coupled to a drain of the second mirror transistor and the first adjustable current source.

In Example 3, the start-up circuit of any one or more of Examples 1-2 optionally includes a reference capacitor configured to provide a boost set point for a boost converter, and a sampling switch configured to selectively couple a second voltage representative of the output voltage to the reference capacitor.

In Example 4, the start-up circuit of any one or more of Examples 1-3 optionally includes an adaptive reference circuit configured to step up a reference voltage of the voltage converter. In certain examples, the adaptive reference circuit can include a step circuit configured to adjust a voltage of the reference capacitor responsive to first and second clock signals, a comparator configured to compare the voltage of the reference capacitor to the second voltage representative of the output voltage, and a clock generator configured to receive an output of the comparator and to generate the first and second clock signals.

In Example 5, the step circuit of any one or more of Examples 1-4 optionally includes a step capacitor, a first step switch configured to couple a set point voltage to the step capacitor during a first state of the first clock signal, and a second step switch configured to respond to the second clock signal, the second step switch configured to couple the step capacitor to the reference capacitor during a first state of the second clock signal.

In Example 6, the first step switch of any one or more of Examples 1-5 optionally is configured to isolate the set point voltage from the step capacitor during a second state of the first clock signal.

In Example 7, the second step switch of any one or more of Examples 1-6 optionally is configured to isolate the step capacitor from the reference capacitor during a second state of the second clock signal.

In Example 8, a method of starting a voltage converter can include receiving an input voltage at an input terminal of the voltage converter, coupling the input terminal to an output terminal of the voltage converter using a modified current mirror, receiving an indication of an output voltage of the voltage converter at first and second current sources of the modified current mirror, and adjusting the first and second current sources to limit a startup charging current of the voltage converter until the output voltage is substantially equal to the input voltage.

In Example 9, the method of any one or more of Examples 1-8 optionally includes selectively coupling a second voltage representative of the output voltage to a reference capacitor, and providing a boost set point to a boost converter using a voltage of the reference capacitor.

In Example 10, the method of any one or more of Examples 1-9 optionally includes comparing the voltage of the reference capacitor to the second voltage representative of the output voltage, generating first and second clock signals using the comparison of the voltage of the reference capacitor and the second voltage representative of the output voltage, and incrementing the voltage of the reference capacitor using the first and second clock signals.

In Example 11, the incrementing the voltage of the reference capacitor of any one or more of Examples 1-10 optionally includes receiving the first clock signal at a first step switch, receiving the second clock signal at a second step switch, coupling a set point voltage to a step capacitor during a first state of the first clock signal using the first step switch, and coupling the step capacitor to the reference capacitor during a first state of the second clock signal using the second step switch.

In Example 12, the method of any one or more of Examples 1-2 optionally includes isolating the set point voltage from the step capacitor during a second state of the first clock signal.

In Example 13, the method of any one or more of Examples 1-2 optionally includes isolating the step capacitor from the reference capacitor during a second state of the second clock signal.

In Example 14, a voltage converter can include a boost converter configured to receive an input voltage and to provide a predetermined output voltage that is higher than the input voltage, and a start-up circuit configured to raise an output voltage to substantially equal the input voltage during a start-up interval of the voltage converter before the boost converter is enabled. In certain examples, the start-up circuit can include a linear current generator configured to couple a supply terminal of the voltage converter to an output terminal of the voltage converter, and a feedback circuit. In certain examples, the linear current generator can include a modified current mirror including a first adjustable current source and a second adjustable current source. IN some examples, the feedback circuit can be configured to provide a first representative of an output voltage of the output terminal to an input of each of the first and second adjustable current sources.

In Example 15, the startup circuit of Example 14 optionally is configured to limit a charging current of the voltage converter during the start-up interval using the linear current generator, to provide a sample of the output voltage as a boost set point during the start-up interval, and to incrementally raise the boost set point to a predetermined level associated with the predetermined output voltage after the boost converter is enabled.

In Example 16, the modified current mirror of any one or more of Examples 14-15 optionally includes a first sense transistor coupled to the supply terminal, a first mirror transistor having a gate coupled to a gate of the first sense transistor, the first mirror transistor coupled to the supply terminal and the output terminal, a second sense transistor coupled in series with the first mirror transistor and the second adjustable current source, and coupled to the output terminal, and a second mirror transistor having a gate coupled to a gate of the second sense transistor, the second mirror transistor coupled in series with the first sense transistor, wherein the gate of the first sense transistor is coupled to a drain of the second mirror transistor and the first adjustable current source.

In Example 17, the voltage converter of any one or more of Examples 14-16 optionally includes a reference capacitor configured to provide a boost set point for a boost converter, and a sampling switch configured to selectively couple a second voltage representative of the output voltage to the reference capacitor.

In Example 18, the voltage converter of any one or more of Examples 14-17 optionally includes an adaptive reference circuit configured to step up a reference voltage of the voltage converter. In certain examples, the adaptive reference circuit can include a step circuit configured to adjust a voltage of the reference capacitor responsive to first and second clock signals, a comparator configured to compare the voltage of the reference capacitor to the second voltage representative of the output voltage, and a clock generator configured to receive an output of the comparator and to generate the first and second clock signals.

In Example 19, the step circuit of any one or more of Examples 14-18 optionally includes a step capacitor, a first step switch configured to couple a set point voltage to the step capacitor during a first state of the first clock signal, and a second step switch configured to respond to the second clock signal, the second step switch configured to couple the step capacitor to the reference capacitor during a first state of the second clock signal.

In Example 20, the first step switch of any one or more of Examples 14-19 optionally is configured to isolate the set point voltage from the step capacitor during a second state of the first clock signal, and the second step switch of any one or more of Examples 14-19 optionally is configured to isolate the step capacitor from the reference capacitor during a second state of the second clock signal.

Example 21 can include, or can optionally be combined with any portion or combination of any portions of any one or more of Examples 1 through 20 to include, subject matter that can include means for performing any one or more of the functions of Examples 1 through 20, or a machine-readable medium including instructions that, when performed by a machine, cause the machine to perform any one or more of the functions of Examples 1 through 20.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A start-up circuit for a voltage converter, the start-up circuit comprising:
    a linear current generator configured to couple a supply terminal of the voltage converter to an output terminal of the voltage converter, the linear current generator comprising:
        a modified current mirror, including:
            a first adjustable current source; and
            a second adjustable current source; and
        a feedback circuit configured to provide a first representation of an output voltage of the output terminal to an input of each of the first and second adjustable current sources;
    wherein the modified current mirror includes:
        a first sense transistor coupled to the supply terminal;
        a first mirror transistor having a gate coupled to a gate of the first sense transistor, the first mirror transistor coupled to the supply terminal and the output terminal;
        a second sense transistor coupled in series with the first mirror transistor and the second adjustable current source, and coupled to the output terminal; and
        a second mirror transistor having a gate coupled to a gate of the second sense transistor, the second mirror transistor coupled in series with the first sense transistor, wherein the gate of the first sense transistor is coupled to a drain of the second mirror transistor and the first adjustable current source.

2. The start-up circuit of claim 1, including:
    a reference capacitor configured to provide a boost set point for a boost converter; and
    a sampling switch configured to selectively couple a second voltage representative of the output voltage to the reference capacitor.

3. The start-up circuit of claim 2, including an adaptive reference circuit configured to step up a reference voltage of the voltage converter, the adaptive reference circuit comprising:
    a step circuit configured to adjust a voltage of the reference capacitor responsive to first and second clock signals;

a comparator configured to compare the voltage of the reference capacitor to the second voltage representative of the output voltage; and a clock generator configured to receive an output of the comparator and to generate the first and second clock signals.

4. The start-up circuit of claim 3, wherein the step circuit includes:

a step capacitor;

a first step switch configured to couple a set point voltage to the step capacitor during a first state of the first clock signal; and a second step switch configured to respond to the second clock signal, the second step switch configured to couple the step capacitor to the reference capacitor during a first state of the second clock signal.

5. The start-up circuit of claim 4, wherein the first step switch is configured to isolate the set point voltage from the step capacitor during a second state of the first clock signal.

6. The start-up circuit of claim 4, wherein the second step switch is configured to isolate the step capacitor from the reference capacitor during a second state of the second clock signal.

7. A method of starting a voltage converter, the method comprising:

receiving an input voltage at an input terminal of the voltage converter;

coupling the input terminal to an output terminal of the voltage converter using a modified current mirror;

receiving an indication of an output voltage of the voltage converter at first and second current sources of the modified current mirror;

adjusting the first and second current sources to limit a startup charging current of the voltage converter until the output voltage is substantially equal to the input voltage;

selectively coupling a second voltage representative of the output voltage to a reference capacitor; and providing a boost set point to a boost converter using a voltage of the reference capacitor.

8. The method of claim 7, including:

comparing the voltage of the reference capacitor to the second voltage representative of the output voltage;

generating first and second clock signals using the comparison of the voltage of the reference capacitor and the second voltage representative of the output voltage; and incrementing the voltage of the reference capacitor using the first and second clock signals.

9. The method of claim 8, wherein incrementing the voltage of the reference capacitor includes:

receiving the first clock signal at a first step switch;

receiving the second clock signal at a second step switch;

coupling a set point voltage to a step capacitor during a first state of the first clock signal using the first step switch; and coupling the step capacitor to the reference capacitor during a first state of the second clock signal using the second step switch.

10. The method of claim 9, including isolating the set point voltage from the step capacitor during a second state of the first clock signal.

11. The method of claim 9, including isolating the step capacitor from the reference capacitor during a second state of the second clock signal.

12. A voltage converter comprising;

a boost converter configured to receive an input voltage and to provide a predetermined output voltage that is higher than the input voltage; and a start-up circuit configured to raise an output voltage to substantially equal the input voltage during a start-up interval of the voltage converter before the boost converter is enabled, the start-up circuit including:

a linear current generator configured to couple a supply terminal of the voltage converter to an output terminal of the voltage converter, the linear current generator comprising:

a modified current mirror including:

a first adjustable current source; and a second adjustable current source; and a feedback circuit configured to provide a first representative of the output voltage at the output terminal to an input of each of the first and second adjustable current sources.

13. The voltage converter of claim 12, wherein the startup circuit is configured to limit a charging current of the voltage converter during the start-up interval using the linear current generator, to provide a sample of the output voltage as a boost set point during the start-up interval, and to incrementally raise the boost set point to a predetermined level associated with the predetermined output voltage after the boost converter is enabled.

14. The voltage converter of claim 12, wherein the modified current mirror includes:

a first sense transistor coupled to the supply terminal;

a first mirror transistor having a gate coupled to a gate of the first sense transistor, the first mirror transistor coupled to the supply terminal and the output terminal;

a second sense transistor coupled in series with the first mirror transistor and the second adjustable current source, and coupled to the output terminal; and a second mirror transistor having a gate coupled to a gate of the second sense transistor, the second mirror transistor coupled in series with the first sense transistor, wherein the gate of the first sense transistor is coupled to a drain of the second mirror transistor and the first adjustable current source.

15. The voltage converter of claim 12, including:

a reference capacitor configured to provide a boost set point for the boost converter; and a sampling switch configured to selectively couple a second voltage representative of the output voltage to the reference capacitor.

16. The voltage converter of claim 15, including an adaptive reference circuit configured to step up a reference voltage of the voltage converter, the adaptive reference circuit comprising:

a step circuit configured to adjust a voltage of the reference capacitor responsive to first and second clock signals;

a comparator configured to compare the voltage of the reference capacitor to the second voltage representative of the output voltage; and a clock generator configured to receive an output of the comparator and to generate the first and second clock signals.

17. The voltage converter of claim 16, wherein the step circuit includes:

a step capacitor;

a first step switch configured to couple a set point voltage to the step capacitor during a first state of the first clock signal; and a second step switch configured to respond to the second clock signal, the second step switch configured to couple the step capacitor to the reference capacitor during a first state of the second clock signal.

18. The voltage converter of claim 17, wherein the first step switch is configured to isolate the set point voltage from the step capacitor during a second state of the first clock signal, and wherein the second step switch is configured to isolate the step capacitor from the reference capacitor during a second state of the second clock signal.

* * * * *